Patented Nov. 26, 1929

1,736,905

UNITED STATES PATENT OFFICE

ERNST FELLMER, OF LEVERKUSEN, NEAR COLOGNE-ON-THE-RHINE, GERMANY, ASSIGNOR TO GENERAL ANILINE WORKS, INC., OF NEW YORK, N. Y., A CORPORATION OF DELAWARE

TRISAZO DYESTUFF

No Drawing. Application filed September 20, 1926, Serial No. 136,726, and in Germany October 14, 1925.

My invention relates to novel tris-azo dyestuffs which dye vegetable fibres fast green shades and which can be further diazotized on the fibre and developed to fast, clear green shades.

The general constitution of my novel dyestuffs can be represented by the schematic formula:

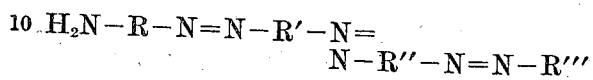

In this formula R stands for the nucleus of a paradiamine of the benzene of naphthalene series, R' for the nucleus of an amine of the benzene of naphthalene series, which couples in para position to the amino group, R'' for an amino-naphthol sulfonic acid compound, substituted in the amino group by a substituent containing an external amino group, and R''' for a yellow producing coupling compound.

These dyestuffs are produced by diazotizing a p-amino-acidyl amine, coupling the diazo compound obtained with a compound R', rediazotizing the amino azo compound so obtained, coupling it with a compound R'', diazotizing the free external amino group, coupling it with a compound R''' and finally eliminating by saponification the acidyl group from the p-acidyl-amine group attached to R'. While this is my preferred process it is also possible to start from a para-nitro-amine and in the last step of the process reducing the nitro to the amino group, the final dyestuff, obtained in both processes is the same.

The different components used in the production of my novel dyestuffs can be exemplified as follows:

As first components, the nucleus of which is shown in the above schematic formula as R, I can use acidyl-p-diamines e. g., acetyl- or oxalyl-p-phenylenediamines, acidyl alpha-alpha-naphthylenediamines and their sulfonic, carboxylic acids, as well as their halogen and oxyalkyl derivates. In the alternative process I use as first components p-nitro-aniline or alpha-nitro-alpha-naphthylamines, their sulfonic, carboxylic acids, halogen and oxalkyl derivates.

As second components, which are amino compounds coupling in para position to the amino group I can use amino-cresol ethers, alpha-naphthylamine, 1-naphthylamine-6- and 7-sulfonic acid, 1-5-amino-naphthol-7-sulfonic acid, 1-2-amino-naphthol ethers and their sulfonic acids etc. I have found it however preferable to use alpha naphthylamine and its sulfonic acids or 1-amino-naphthol sulfonic acids as second component when using naphthylenediamines as first component, and cresol ether or 1-2-aminonaphthol-ether as coupling compound when starting from a para-diamine compound of the benzene series.

As third components one may use such derivatives of 2-amino-5-naphthol-7-sulfonic acid, 2-amino-8-naphthol-6-sulfonic acid, 1-amino-8-naphthol-4-sulfonic acid, other monosulfonic acids of the 2-5, 2-8 or 1-8- aminonaphthols or their disulfonic acids, as are substituted in the amino-group by a substituent carrying an external amino-group; such components are, for instance, amino-benzoyl-amido-naphthol-sulfonic acid, and amino-phenyl-naphthiminazol- and amino-phenyl-naphthothiazol-derivatives.

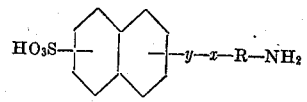

wherein $y$ stands for the NH-group and $x$ stands for the carbonyl group or $y$ and $x$ jointly stand for a heterocyclic ring containing nitrogen and attached to the naphthalene nucleus through a nitrogen atom and R stands for a benzene nucleus.

As last components I use methyl-aryl-pyrazolone or an α methylketol.

The disazo dyestuffs:

which represent one step in the production of the herein described novel tris-azo dyestuffs, with the symbols R etc. having the same meaning as above, dye blue shades. If they are now diazotized and, as provided herein, coupled with these so-called yellow producing coupling compounds, dyestuffs are obtained which dye clear green shades; that is to say, shifted to the yellow part of the spectrum, when compared with the original shade of the disazo-dyestuff.

My novel dyestuffs are water soluble, dark green powders. They dye vegetable fibres green shades.

They contain a free amino group. When diazotized on the fibre they can be coupled with compounds such as beta-naphthol, or phenyl-methyl-pyrazolone. Very fast and, particularly with phenyl-methyl-pyrazolone, very clear and brilliant green shades are produced.

The following examples will further illustrate my invention, the parts being by weight.

*Example 1.*—23 parts 4-acetylamino-1-amino-benzene-2-sulfonic acid are dissolved in water and neutralized with soda ash; the solution is then cooled to about 10° C. and diazotized with 6.9 parts sodium nitrite and 30 parts commercial hydrochloric acid. The solution of the diazo compound is then run into a neutralized solution of 26.7 parts 1-amino-2-naphtholethylether-6-sulfonic acid, containing an excess sodium acetate. The azo compound formed is filtered off, made into a paste with water, transformed into its soluble sodium salt by the addition of 25 parts 16% caustic soda and diazotized at about 15° C. with 6.9 parts sodium nitrite and 69 parts commercial hydrochloric acid, the diazo compound separates and is isolated, it is then in form of a concentrated paste cooled to 0° C. and coupled with 30.5 parts 2-p-aminobenzoylamino-5-naphthol-7-sulfonic acid. The disazo dyestuff is now carefully isolated, made into a paste and again diazotized with 6.9 parts sodium nitrite and 69 parts commercial hydrochloric acid and finally coupled in soda alkaline solution with 13.0 parts methyl-phenyl-pyrazolone. The isolated coupling product is then heated in weakly alkaline solution, whereby the acetyl group is split off. This saponification can also be produced by heating in acid solution. The dyestuff is isolated in the usual manner. It is a dark green powder, soluble in water and has in the free state most probably the formula:

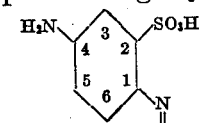
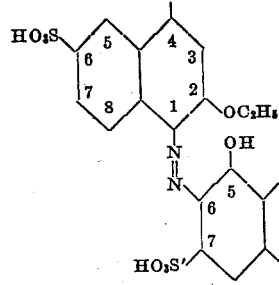
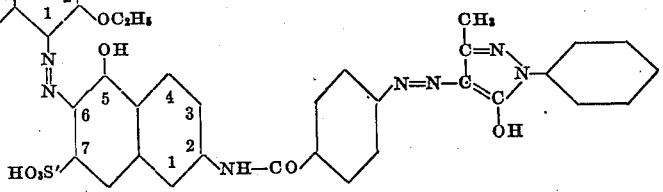

It dyes cotton direct a clear green shade. It can be diazotized on the fibre and when developed with beta-naphthol or methyl-phenyl-pyrazolone fast green shades are obtained.

*Example 2.*—The monoazo compound from 4-acetylamino-1-aminobenzene-2-sulfonic acid and 1-amino-2-naphthalethylether-6-sulfonic acid as obtained in Example 1 is diazotized and the diazo compound made into a paste in concentrated form, and at 0° C. coupled in weakly ammoniacal solution with 30.5 parts 2-p-aminobenzoylamino-8-naphthol-6-sulfonic acid, the diazo compound is salted out, isolated, made into a paste and diazotized at about 15° C. with 6.9 parts sodium nitrite and 69 parts commercial hydrochloric acid, and then coupled in acid solution with 10.0 parts methylketol, the acetyl group is saponified in weakly acid or alkaline solution and the dyestuff salted out from a soda alkaline solution. It has in the free state most probably the formula:

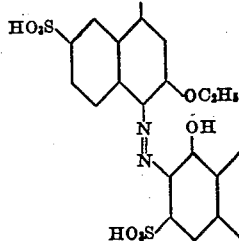
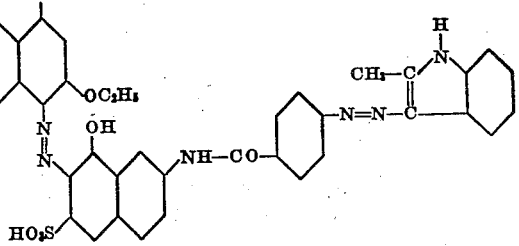

It is a water soluble, dark green powder. It dyes cotton direct green shades. Diazotized and developed with beta-naphthol it produces a blackish-green and with phenyl-methyl-pyrazolone a deep green.

*Example 3.*—28 parts 1-4-acetylnaphthylenediamine-6-sulfonic acid are dissolved in water and soda ash and diazotized at about 15° C. with 6.9 parts sodium nitrite and 30 parts commercial hydrochloric acid, and coupled in acetic solution with 22.3 parts 1-6-naphthylamine-sulfonic acid, the azo compound is then diazotized at room temperature with 6.9 parts sodium nitrite and 69 parts commercial hydrochloric acid, and coupled in soda alkaline solution with 35.8 parts 1-p-aminobenzoylamino-8-naphthol-4-sulfonic acid. The diazo compound is then salted out, filtered off, made into a paste with water, diazotized at 18° C. with 69 parts commercial hydrochloric acid and 6.9 parts sodium nitrite, and coupled in soda alkaline solution with 17.4 parts methyl-phenyl-pyrazolone. The acetyl group is then saponified by heating in weakly alkaline or acid solution and the dyestuff isolated in the usual manner. It has in the free state most probably the formula:

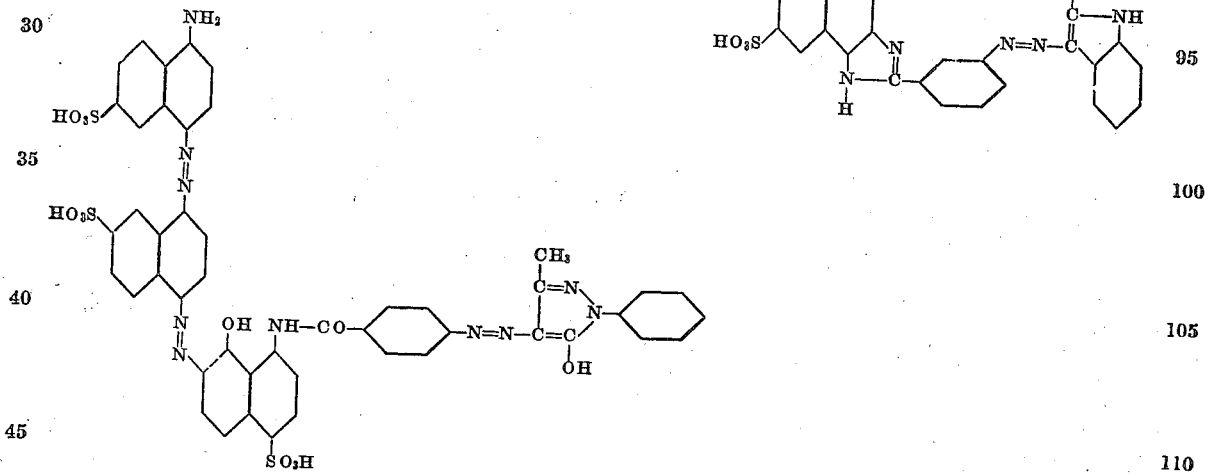

It is a dark green, water soluble powder, and dyes cotton direct green shades which are not changed by diazotizing and developing on the fibre with beta-naphthol or a pyrazolone.

*Example 4.*—26 parts 4-oxalylamino-1-aminobenzene-3-sulfonic acid are dissolved in water with the requisite amount of soda ash and at about 10° C. diazotized with 30 parts commercial hydrochloric acid and 6.9 parts sodium nitrite, an acid solution of 18.7 parts 1-2-aminonaphtholethylether is now added and the congo acid reaction of the solution neutralized by the addition of sodium acetate. After the coupling is complete, the solution is again made acid to congo indicator and the precipitated amino azo compound isolated. It is made into a paste with water and diazotized with 6.9 parts sodium nitrite and 69 parts commercial hydrochloric acid, the insoluble diazo compound is again isolated, made up into a concentrated paste and at 0° C. coupled with a solution of 30 parts aminophenyl-2-naphthiminazol-5-hydroxy-7-sulfonic acid, keeping the reaction mass slightly ammoniacal. The disazo dyestuff is isolated and again diazotized with 6.9 parts sodium nitrite and 69 parts commercial hydrochloric acid and finally coupled with 10 parts methylketol. The oxalyl group is saponified as usual and the finished dyestuff isolated in the usual manner from a soda alkaline solution. It has in the free state most probably the formula:

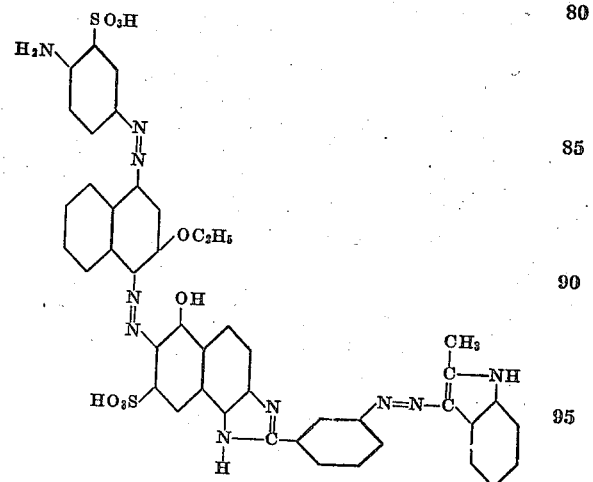

It dyes cotton direct a bluish-green, which diazotized on the fibre and developed with beta-naphthol produces a greyish-green and with pyrazolone a green.

I claim:

1. As new products tris-azo dyestuffs of the general formula:

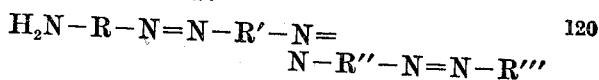

in which R stands for the nucleus of a paradiamine of the benzene or naphthalene series, R' for the nucleus of an amine of the benzene or naphthalene series capable of coupling in para position to the amino group, R" for the nucleus of an amino-naphthol sulfonic acid compound, substituted in the amino group by a substituent containing an external free amino group and R''' for a compound of the group comprising methyl-phenyl-pyrazolones and alpha-methyl-indol compounds, which in form of their alkali metal salts are water soluble dark colored powders dyeing vegetable fibre green shades, which can be diazotized on the fibre and developed to green shades with the usual developers such as beta-naphthol and pyrazolone.

2. As new products tris-azo dyestuffs of the general formula:

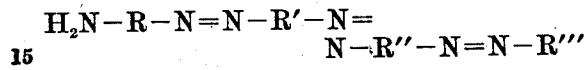

in which R stands for the nucleus of a para-diamine of the benzene or naphthalene series, R' for the nucleus of an amine of the benzene or naphthalene series, capable of coupling in para position to the amino group, R'' for the nucleus of an aminonaphthol sulfonic acid compound, substituted in the amino group by a substituent containing an external free amino group and R''' for 3-methyl-1-phenyl pyrazolone compound, which in form of their alkali metal salts are water soluble dark colored powders, dyeing vegetable fibre green shades, which can be diazotized on the fibre and developed to green shades with the usual developers such as beta-naphthol and pyrazolone.

3. As new products tris-azo compounds of the general formula:

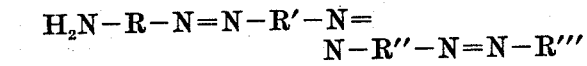

in which R stands for the nucleus of a para-diamine of the benzene or naphthalene series, R' for the nucleus of an amine of the benzene or naphthalene series capable of coupling in para position to the amino group, R'' for an aminobenzoylamino-naphthol-sulfonic acid and R''' for a methyl-phenyl-pyrazolone, which in form of their alkali metal salts are water soluble dark colored powders, dyeing vegetable fibre green shades, which can be diazotized on the fibre and developed to green shades with the usual developers such as beta-naphthol and pyrazolone.

4. As new products tris-azo compounds of the general formula:

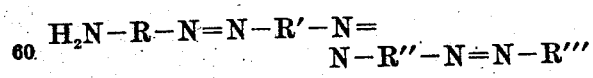

in which R stands for the nucleus of a para-diamine-sulfonic acid of the benzene or naphthalene series, R' for the nucleus of an amine of the benzene or naphthalene series capable of coupling in para position to the amino group, R'' for an amino-naphthol sulfonic acid compound, substituted in the amino group by a substituent containing an external free amino group and R''' for a compound of the group comprising methyl-phenyl pyrazolones and alpha-methyl-indol compounds, which in form of their alkali metal salts are water soluble dark colored powders, dyeing vegetable fibre green shades, which can be diazotized on the fibre and developed to green shades with the usual developers such as beta-naphthol and pyrazolone.

5. As new products tris-azo dyestuffs of the general formula:

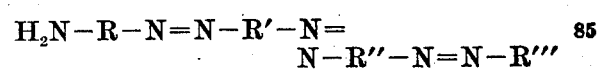

in which R stands for the nucleus of a para-phenylene-diamine sulfonic acid, R' for the nucleus of an amino-alkyl-ether compound of the benzene or naphthalene compound capable of coupling in para position to the amino group, R'' for an aminonaphthol sulfonic acid compound, substituted in the amino group by a substituent containing an external free amino group, and R''' for a yellow producing coupling compound of the group comprising methyl-phenyl pyrazolones and alphamethyl-indole compounds, which in form of their alkali metal salts are water soluble dark colored powders, dyeing vegetable fibre green shades, which can be diazotized on the fibre and developed to green shades with the usual developers such as beta-naphthol and pyrazolone.

6. As new products tris-azo dyestuffs of the general formula:

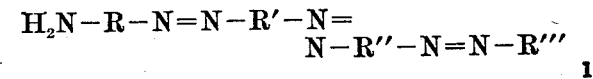

in which R stands for the nucleus of a para-phenylene-diamine sulfonic acid, R' for the nucleus of an amino-naphtholether compound, R'' for an aminobenzoyl-amino-naphthol sulfonic acid and R''' for a methyl-phenyl pyrazolone compound, which in form of their alkali metal salts are water soluble dark colored powders, dyeing vegetable fibre green shades, which can be diazotized on the fibre and developed to green shades with the usual developers such as beta-naphthol and pyrazolone.

7. As a new product the tris-azo dyestuff having in the free state most probably the formula:
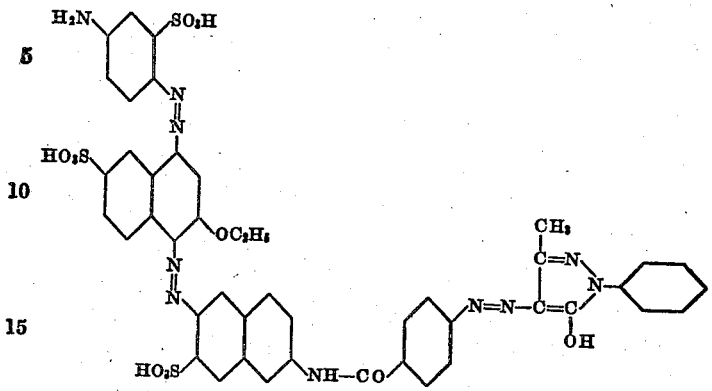
which in form of its alkali metal salts is a dark green water soluble powder, dyeing cotton direct clear green shades which can be diazotized on the fibre and when developed with methyl-phenyl-pyrazolone produces green fast shades.
In testimony whereof, I affix my signature.
ERNST FELLMER.